(12) United States Patent
Lee

(10) Patent No.: US 11,124,749 B2
(45) Date of Patent: Sep. 21, 2021

(54) BEVERAGE MAKER

(71) Applicant: LG ELECTRONICS INC., Seoul (KR)

(72) Inventor: Jeyeol Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 163 days.

(21) Appl. No.: 16/668,429

(22) Filed: Oct. 30, 2019

(65) Prior Publication Data

US 2020/0140794 A1    May 7, 2020

(30) Foreign Application Priority Data

Nov. 1, 2018 (KR) .................. 10-2018-0133127

(51) Int. Cl.
*C12C 13/10* (2006.01)
*B67D 1/08* (2006.01)
*B67D 1/00* (2006.01)

(52) U.S. Cl.
CPC ............ *C12C 13/10* (2013.01); *B67D 1/0016* (2013.01); *B67D 1/0805* (2013.01); *B67D 1/0888* (2013.01)

(58) Field of Classification Search
CPC .... C12C 13/10; B67D 1/0805; B67D 1/0888; B67D 1/0016
See application file for complete search history.

(56) References Cited

U.S. PATENT DOCUMENTS

| | | | | |
|---|---|---|---|---|
| 4,557,186 A * | 12/1985 | Brown | ................... | C12C 13/00 426/16 |
| 4,717,031 A * | 1/1988 | Hewson | ................ | C12C 11/003 215/384 |
| 4,754,698 A * | 7/1988 | Naish | ..................... | C12C 13/10 99/275 |
| 6,032,571 A * | 3/2000 | Brous | ..................... | C12C 13/10 366/249 |
| 6,561,078 B1 * | 5/2003 | Hughes | ................... | C12C 13/10 210/242.1 |
| 7,963,213 B1 * | 6/2011 | Murdock | ................. | C12C 13/10 99/323.1 |
| 10,253,284 B2 * | 4/2019 | Blichmann | ............. | C12C 13/10 |
| 10,968,419 B1 * | 4/2021 | Lanning | ................. | C12C 13/10 |
| 2010/0129490 A1 * | 5/2010 | Williams | .............. | C12C 11/006 426/11 |
| 2010/0323059 A1 * | 12/2010 | Wallace | ................ | C12C 11/006 426/11 |
| 2014/0017354 A1 * | 1/2014 | Joseph | .................... | C12C 13/10 426/16 |

(Continued)

*Primary Examiner* — Donnell A Long
(74) *Attorney, Agent, or Firm* — KED & Associates LLP

(57) ABSTRACT

A beverage maker may include a fermentation tank having a space to make a beverage therein; an ingredient supplier having a space to contain at least some of ingredients for making the beverage; a water tank configured to contain water to make the beverage; an output interface including at least one of a display or a speaker; and a controller configured to control a beverage making preparation operation and a beverage making operation for making the beverage. When the beverage making preparation operation is completed, the controller may be configured to output a request for removal of a residual ingredient of the ingredient supplier and residual water of the water tank through the output interface.

20 Claims, 9 Drawing Sheets

(56) References Cited

U.S. PATENT DOCUMENTS

| | | | |
|---|---|---|---|
| 2014/0374444 A1* | 12/2014 | Forte | E03B 11/02 |
| | | | 222/144.5 |
| 2015/0027504 A1* | 1/2015 | Milroy | B08B 9/0826 |
| | | | 134/169 R |
| 2016/0092851 A1* | 3/2016 | De Berg Hewett | G06Q 20/401 |
| | | | 705/15 |
| 2016/0201018 A1* | 7/2016 | Watson | A47J 27/08 |
| | | | 426/11 |
| 2016/0348046 A1* | 12/2016 | Wood | C12H 1/22 |
| 2017/0050225 A1* | 2/2017 | Garrison | B08B 9/093 |
| 2017/0292099 A1* | 10/2017 | Wolter | C12C 7/26 |
| 2018/0072972 A1* | 3/2018 | Shin | C12C 13/10 |
| 2019/0136164 A1* | 5/2019 | Van De Kooij | C12C 7/04 |
| 2019/0153368 A1* | 5/2019 | Yoon | C12C 11/003 |
| 2019/0153369 A1* | 5/2019 | Heo | C12C 13/10 |
| 2020/0157477 A1* | 5/2020 | Lee | C12C 11/006 |
| 2020/0208084 A1* | 7/2020 | Lee | F25B 1/00 |
| 2021/0139309 A1* | 5/2021 | Alpmen | B67D 1/00 |

* cited by examiner

BEVERAGE MAKER

CROSS-REFERENCE TO RELATED APPLICATION(S)

This application claims priority under 35 U.S.C. 119 and 365 to Korean Patent Application No. 10-2018-0133127, filed in Korea on Nov. 1, 2018 in the Korean Intellectual Property Office, the disclosure of which is incorporated herein by reference.

BACKGROUND

1. Field

A beverage maker, and more particularly, a beverage maker which has an ingredient supplier to contain ingredients for making a beverage is disclosed herein.

2. Background

Beverages are collectively referred to as drinkable liquids, such as alcohol or tea, for example. Beverages may be divided into various categories, such as water (a beverage) to solve thirst, juice beverages with unique flavour and taste, refreshing beverages giving a refreshing sensation, favorite beverages with an arousal effect, or alcoholic beverages with an alcohol effect, for example.

A representative example of such a beverage is beer. Beer is an alcoholic beverage produced by making juice of malt, which is made by sprouting barley, filtering the juice, adding hop, and fermenting yeast.

Consumers may purchase ready-made products made and sold by a beer maker or make beer at home (hereinafter "homemade beer") produced by directly fermenting beer ingredients at home or in a bar. Homemade beer may be made in a variety of types rather than ready-made products and may be made to better suit a consumer's taste.

The ingredients for making beer may include water, liquid malt, hop, yeast, and flavouring additive, for example. Leaven, which is called yeast, may be added to liquid malt to ferment the liquid malt and assist production of alcohol and carbonic acid. The flavour additives are additives that enhance the taste of beer, such as fruit, syrup, and vanilla beans, for example.

Generally, homemade beer may include three stages or operations, namely, a wort production operation, a fermentation operation, and an aging operation, and it may take about two to three weeks from the wort production operation to the aging operation. It is important for homemade beer to maintain an optimum temperature during the fermentation stage, and the more the beer is more simply made, the more user convenience is improved.

In recent years, a beverage maker capable of easily making a beer-like beverage in a home or a bar has been gradually used, and such a beverage maker is configured to be convenient.

BRIEF DESCRIPTION OF THE DRAWINGS

Embodiments will be described in detail with reference to the following drawings in which like reference numerals refer to like elements, and wherein.

DETAILED DESCRIPTION

Figure 1:
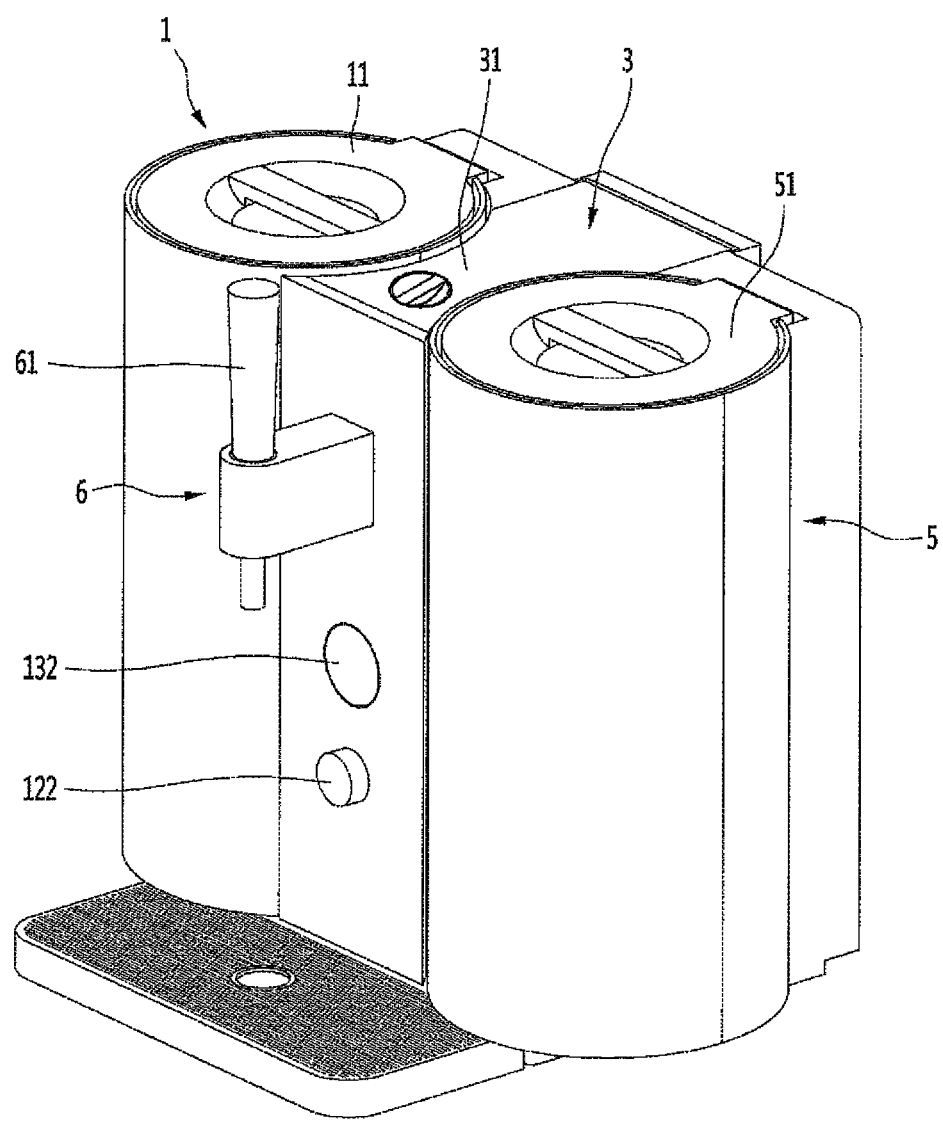
FIG. 1 is a perspective view of the beverage maker according to an embodiment.

Hereinafter, embodiments will be described with reference to the accompanying drawings. Wherever possible, the same or like reference numerals have been used to indicate the same or like elements, and repetitive disclosure has been omitted.

Although beer is exemplified as a beverage made using a beverage maker according to embodiments, the kind of beverage capable of being made using the beverage maker is not limited to beer. For example, various kinds of beverages may be made using the beverage maker according to embodiments.

FIG. 1 is a perspective view of a beverage maker according to an embodiment. The beverage maker may include a fermentation module 1. In the fermentation module 1, a process such as fermentation of a beverage may be performed to make a beverage, and the made beverage may be stored.

The fermentation module 1 may include a fermentation tank having an inner space formed therein. That is, a beverage may be made in the fermentation tank, and the made beverage may be stored. The fermentation module 1 may further include a fermentation lid 11 to open and close the fermentation tank.

The beverage maker may include various components to make the beverage. For example, the beverage maker may include a thermostat to control a temperature inside of the fermentation module 1, a gas exhauster to adjust a pressure, a temperature sensor to detect a temperature inside of the fermentation module 1, and a pressure sensor to detect a pressure inside of the fermentation module 1.

The beverage maker may include a water supply module 5. The water supply module 5 may supply water necessary for making the beverage to the fermentation module 1. The water supply module 5 may include a water tank containing the water, and a water tank lid 51 to open and close the water tank.

The beverage maker may include an ingredient supplier 3 containing at least some of ingredients necessary for making the beverage. The ingredient supplier 3 may be connected with the fermentation module 1. Accordingly, ingredients contained in the ingredient supplier 3 may be input into the fermentation module 1 based on an input time of each ingredient when the beverage is made.

The ingredient supplier 3 may include an ingredient receiver to contain at least some of the ingredients, and an ingredient supplier lid 31 to open and close the ingredient receiver. At least one ingredient container may be contained in the ingredient receiver. Different types of ingredients may be contained in each of the at least one ingredient container. That is, at least some of the ingredients may be input into the ingredient supplier 3 while being contained in the ingredient container. The ingredient container may be implemented using a capsule; however, embodiments are not limited thereto.

The beverage maker may include a beverage dispenser 6 to dispense the beverage made in the fermentation module 1 to the outside. The beverage dispenser 6 may dispense the beverage to the outside based on an operation of a lever 61 by a user.

The beverage maker may include an input interface to receive input of a command related to beverage making by the beverage maker. The input interface may include at least one of a touch pad which receives an input of a user's command in a touch method, a rotary knob which is held and rotated by the user, and/or a button which is pressed by the user, for example.

For example, the input interface may include a rotary knob 122. The rotary knob 122 may be disposed on a front surface of the beverage maker. For example, the rotary knob 122 may be disposed lower than a display 132; however, embodiments are not limited thereto.

The rotary knob 122 may function as a button which is pressed by the user. That is, the user may input a control command by holding and turning the rotary knob 122, or by pressing a front surface of the rotary knob 122.

The input interface may include a touch pad 124 to receive input of a user's command in a touching method. For example, the touch pad 124 may be integrally formed with the display 132. In this case, the display 132 may also function as a touch screen.

The beverage maker may include the display 132 to display a variety of information of the beverage maker. For example, the display 132 may be formed at a position where the display 132 is not hidden by the beverage dispenser 6 on the front surface of the beverage maker, such that the display 132 may be easily checked by the user with the naked eye.

Figure 2:
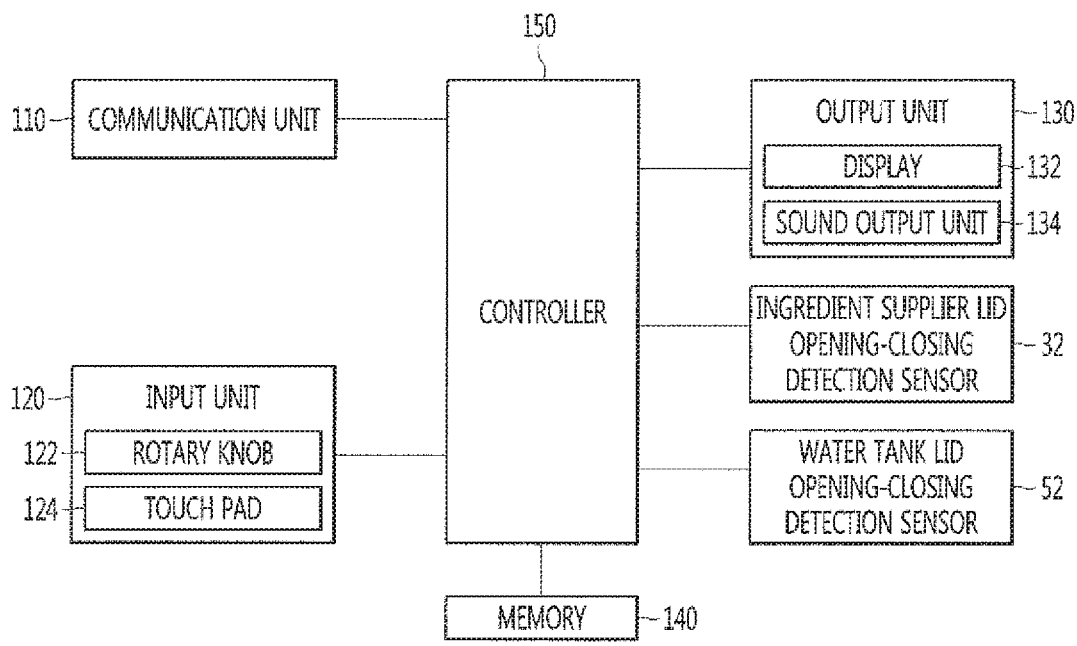
FIG. 2 is a schematic block diagram illustrating a control configuration of the beverage maker according to an embodiment.

FIG. 2 is a schematic block diagram illustrating a control configuration of the beverage maker according to an embodiment. Referring to FIG. 2, the beverage maker may include a communication interface 110, the input interface 120, an output interface 130, a memory 140, and a controller 150. The control components illustrated in FIG. 2 are not essential for implementation of the beverage maker, and the beverage maker may include more components or fewer components according to an embodiment.

The beverage maker may include the communication interface 110 to communicate with a terminal, such as a smartphone, and/or a tablet PC, for example, or a server. For example, the controller 150 may receive a request for execution of the beverage making function from a terminal of the user, or may receive recipe information through the communication interface 110. In addition, the controller 150 may transmit a variety of information regarding operations of the beverage maker, a making state of the beverage, or a storage state to the terminal or the server through the communication interface 110, for example.

The communication interface 110 may include a module that supports at least one of already-known various wired or wireless communication methods. For example, the communication interface 110 may include a module of short-range wireless communication, such as Bluetooth, or near field communication (NFC), for example, or a wireless Internet module, such as a wireless local area network (WLAN) module, for example. Each of the modules may be implemented as a modem or a transceiver.

The input interface 120 may be provided to receive various requests or commands from the user. For example, the input interface 120 may include the rotary knob 122, the touch pad 124 (or touch screen), and/or other buttons or a microphone, for example. The controller 150 may receive a request for execution of a beverage making function, recipe information, and/or control commands regarding various operations of the beverage maker, for example, through the input interface 120.

The output interface 130 may output a variety of information related to an operation or a state of the beverage maker, and a variety of information related to a beverage which is being made or stored in the beverage maker, for example. For example, the output interface 130 may include the display 132 to output the information in the form of a graphic or text, and a sound output interface 134 to output the information in the form of a voice; however, embodiments are not limited hereto.

The display 132 may display various screens related to operations of the beverage maker. For example, the display 132 may display a screen including information related to a current operation of the beverage maker, various menu screens for executing a specific operation of the beverage maker, and/or a screen including information related to a beverage which is being made or stored in the beverage maker.

The display 132 may be implemented using a liquid crystal display (LCD), a light emitting diode (LED) display, and/or an organic LED (OLED) display, for example. In the following description, it is assumed that the display 132 is formed in a circular shape; however, embodiments are not limited thereto and the shape of the display 132 may be freely changed.

While performing the beverage making function, the controller 150 may display a screen requesting removal of residual ingredients (or an ingredient container) contained in the ingredient supplier 3, and/or water contained in the water tank in the water supply module 5, through the display 132. The user may remove the residual ingredients or water based on the output screen, such that contamination caused by the residual ingredients or water left unused for a long time may be prevented.

Embodiments regarding this will be described below with reference to FIGS. 4 to 8B.

The memory 140 may store a variety of information or data related to operations of the beverage maker. For example, the memory 140 may store predetermined recipe information regarding beverages to be made, various setting values, and/or various program data for operations of the beverage maker. In addition, the memory 140 may store various graphic data related to the screens displayed through the display 132.

The controller 150 may control overall operations of the beverage maker. The controller 150 may refer to at least one controller. The at least one controller may be implemented using hardware, such as a CPU, an application processor, a micro-computer (or mi-com), and/or an integrated circuit, for example.

The beverage maker may include an ingredient supplier lid opening-closing detection sensor 32 to detect opening and closing of the ingredient supplier lid 31, and a water tank lid opening-closing detection sensor 52 to detect opening and closing of the water tank lid 51. Each of the ingredient supplier lid opening-closing detection sensor 32 and the water tank lid opening-closing detection sensor 52 may be implemented using a sensor capable of detecting opening and closing of the lid, such as a proximity sensor, a motion sensor, and/or a hall sensor, for example.

The controller 150 may detect opening and closing of the ingredient supplier lid 31 based on a result of detecting by the ingredient supplier lid opening-closing detection sensor 32, and may detect opening and closing of the water tank lid 51 based on a result of detecting by the water tank lid opening-closing detection sensor 52. The controller 150 may detect that ingredients (or an ingredient container) are put into the ingredient supplier 3, or may detect that residual ingredients (or the ingredient container) contained in the ingredient supplier 3 are removed, based on a result of detecting by the ingredient supplier lid opening-closing detection sensor 32. In addition, the controller 150 may detect that water is put into the water tank or that water is removed from the water tank, based on a result of detecting by the water tank lid opening-closing detection sensor 52.

Figure 3:
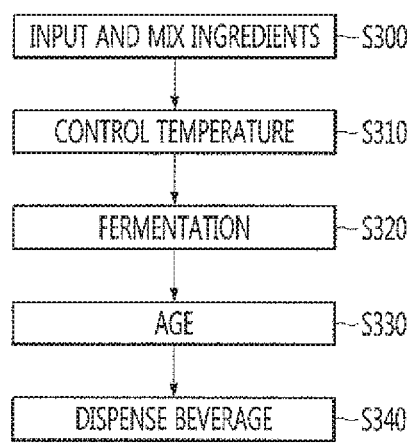
FIG. 3 is a flowchart to schematically explain operations related to a beverage making function of the beverage maker.

FIG. 3 is a flowchart to schematically explain operations related to a beverage making function of the beverage maker. In the drawings described hereinafter, it is assumed that the beverage made by the beverage maker is beer by way of an example, but the made beverage is not limited to beer. In addition, a portion or all of the control stages or operations related to the beverage making function of the beverage maker may be changed according to a type of a beverage to be made.

Referring to FIG. 3, the beverage maker may perform operations to make the beverage upon receiving a request for execution of the beverage making function from the user. The beverage maker may perform an ingredient inputting and mixing operation of putting ingredients for making the beverage into the fermentation tank of the fermentation module 1, and of mixing the input ingredients (S300).

For example, when the request for execution of the beverage making function is received, the beverage maker may obtain recipe information regarding the beverage to be made from the user. After obtaining the recipe information, the beverage maker may request the user to put water into the water tank of the water supply module 5, and may request the user to put the ingredients into the ingredient supplier 3.

When the water and the ingredients are input by the user, the controller 150 may control a water supply pump (not shown) included in the water supply module 5 to supply water to the fermentation tank. In addition, the controller 150 may control the water supply pump to supply water to the ingredient supplier 3. The water supplied to the ingredient supplier 3 may be supplied to the fermentation tank along with the ingredients contained in the ingredient supplier 3.

The water and the ingredients input into the fermentation tank may be mixed. In this case, to effectively mix the water and the ingredients, the beverage maker may control a water supply heater (not shown) provided in the water supply module 5 to supply heated water to the fermentation tank. Alternatively, the beverage maker may include an air injector (not shown) inducing effective mixing of the water and the ingredients by injecting air.

The beverage maker may perform a temperature control operation of controlling a temperature of the mixture of the water and the ingredients input into the fermentation tank (S310). For example, to promote activation of yeast among the ingredients input into the fermentation tank, the beverage maker may control a thermostat to control a temperature in the fermentation tank to an activation promoting temperature of yeast.

The beverage maker may control the thermostat to control the temperature in the fermentation tank to a fermentation setting temperature to perform a fermentation operation (S320). The temperature control operation may be performed after the ingredient inputting and mixing operation (S300) is completed, or may be performed in parallel after the ingredient inputting and mixing operation (S300) is performed for a predetermined period of time.

In the embodiment illustrated in FIG. 3, the operations related to the beverage making function may be divided into a beverage making preparation operation and a beverage making operation. The beverage making preparation operation is an operation in which ingredients for making the beverage are input or an environment is configured, and in the case of FIG. 3, the ingredient inputting and mixing operation (S300) and the temperature control operation (S310) may correspond to the beverage making preparation operation. The beverage making operation is an operation of actually making the beverage, and the fermentation operation (S320) and an aging operation (S330), which will be described hereinafter, may correspond to the beverage making operation.

After completing the beverage making preparation operation, the beverage maker may perform the fermentation operation with respect to the mixture of the water and the ingredients contained in the fermentation tank (S320). For example, the fermentation operation may include a first fermentation to create alcohol in the beverage, and a second fermentation to create carbonic acid in the beverage. The beverage maker may control the thermostat to maintain the temperature in the fermentation tank at a set or predetermined temperature with respect to each of the first fermentation and the second fermentation.

After the fermentation operation (S320) is performed, the making of the beverage is completed. However, to enhance flavour and taste of the beverage, the beverage maker may further perform the aging operation (S330). In this case, after the aging operation (S330) is completed, the making of the beverage is completed.

The beverage maker may perform a beverage dispensing operation (S340) of dispensing the beverage after the making of the beverage is completed. At the beverage dispensing operation (S340), the user may dispense the beverage by operating the lever 61 of the beverage dispenser 6. When the lever 61 is operated, the beverage in the fermentation tank 12 may pass through a channel between the fermentation module 1 and the beverage dispenser 6, and may be dispensed to the outside through the beverage dispenser 6.

According to an embodiment, when the dispensing of the beverage is completed, the beverage maker may perform a cleaning operation for inner channels and the ingredient supplier 3. In addition, the cleaning operation may be performed before a request for execution of the beverage making function is received and the user puts ingredients or water into the beverage maker.

In the middle of or while performing the beverage making operation (the fermentation operation and the aging operation), the ingredients contained in the ingredient supplier 3 or the water contained in the water tank of the water supply module 5 are not input into the fermentation tank.

The fermentation operation and the aging operation may be performed for a long period of time, that is, for several days. In this case, residual ingredients contained in the ingredient supplier 3 or water contained in the water tank are left unused for a long period of time, and the inside of the ingredient supplier 3 and the inside of the water tank may be contaminated. In addition, when the cleaning operation is performed with the residual ingredients (or ingredient container) being contained in the ingredient supplier 3, the inside of the ingredient supplier 3 or the channels may not be effectively cleaned due to the residual ingredients.

The beverage maker according to an embodiment may request to remove the residual ingredient (or ingredient container) contained in the ingredient supplier 3 and the water (residual water) contained in the water tank, after completing the beverage making preparation operation, such that the inside of the ingredient supplier 3 and the inside of the water tank may be prevented from being contaminated in advance. Embodiments regarding this will be described hereinafter with reference to FIGS. 4 to 8B.

Figure 4:
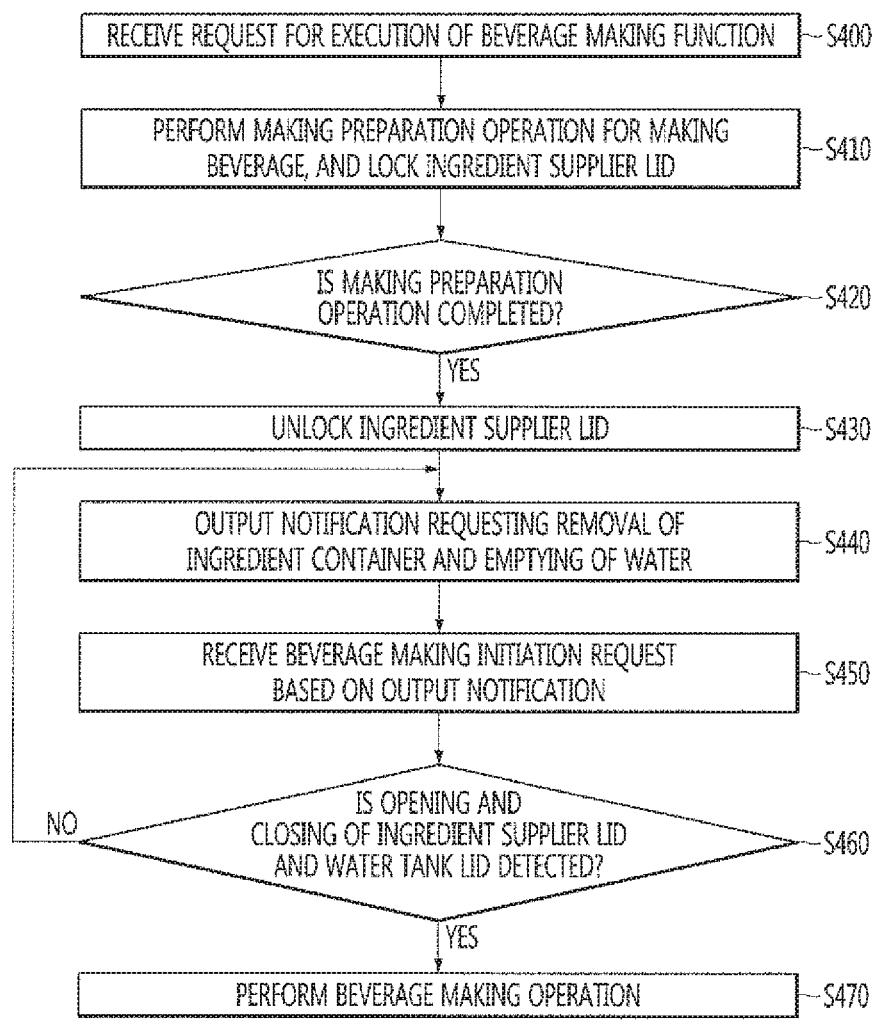
FIG. 4 is a flowchart to explain operations of the beverage maker requesting and detecting removal of an ingredient container contained in an ingredient supplier, and emptying of water of a water tank, in the middle of performing a beverage making function.

FIG. 4 is a flowchart to explain operations of the beverage maker requesting and detecting removal of the ingredient container contained in the ingredient supplier, and emptying of the water in the water tank, while performing the beverage making function. In the drawings described hereinafter, it is assumed that the input interface 120 of the beverage maker is the rotary knob 122, and the output interface 130 is the display 132. However, the input interface 120 and the output interface 130 are not limited thereto.

Referring to FIG. 4, the beverage maker may receive a request for execution of the beverage making function from the user (S400), and may perform the beverage making preparation operation for making a beverage in response to the received request (S410). The beverage maker may perform the beverage making preparation operation for making the beverage as described above with reference to FIG. 3, upon receiving the request for execution of the beverage making function.

In the middle of or while performing the beverage making preparation operation, the controller 150 may prevent the user from arbitrarily opening the ingredient supplier lid 31 by locking the ingredient supplier lid 31 after the user puts ingredients (or an ingredient container) into the ingredient supplier 3. For example, the controller 150 may detect that the user has put ingredients (or an ingredient container) into the ingredient supplier 3 by detecting that the ingredient supplier lid 31 is opened and closed through the ingredient supplier lid opening-closing detection sensor 32. When it is detected that the ingredients have been put into the ingredient supplier 3, the controller 150 may lock the ingredient supplier lid 31.

According to an embodiment, the controller 150 may lock the water tank lid 51 after the user puts water into the water tank. To achieve this, the beverage maker may further include a locking device of the ingredient supplier lid 31 and a locking device of the water tank lid 51. The controller 150 may control the locking devices to lock/unlock the ingredient supplier lid 31 and the water tank lid 51. Each of the locking devices may be implemented using various locking means, such as an electronic type locking device, for example.

That is, the controller 150 may lock the ingredient supplier lid 31 and the water tank lid 51 in the middle of or while performing the beverage making preparation operation, such that the user may be prevented from arbitrarily opening the ingredient supplier lid 31 or the water tank lid 51 and removing the ingredients or water, and thus, a problem that the beverage is not normally made may be prevented.

When the beverage making preparation operation is completed (YES in S420), the beverage maker may unlock the ingredient supplier lid 31 (S430), and may output a notification requesting removal of the ingredients (or the ingredient container) contained in the ingredient supplier 3 or emptying of the water of the water tank (S440). In the beverage making operation, water or ingredients may not be put into the fermentation module 1 or the fermentation tank any longer. Accordingly, residual ingredients or ingredient container contained in the ingredient supplier 3 may be removed from the ingredient supplier 3, and the water (residual water) contained in the water tank of the water supply module 5 may be removed from the water tank.

In this description, it is illustrated that, when the beverage making preparation operation is completed, the notification requesting removal of the ingredients and emptying of the water of the water tank is output. However, this is merely an example for convenience of explanation. More specifically, the notification requesting removal of the ingredients and emptying of the water of the water tank may be output after the ingredients contained in the ingredient supplier 3 and the water contained in the water tank are put into the fermentation tank.

The controller 150 may control the locking device to unlock the ingredient supplier lid 31 when the beverage making preparation operation is completed. According to an embodiment, when the water tank lid 51 is locked (S410), the controller 150 may unlock the water tank lid 51 (S430).

After unlocking the ingredient supplier lid 31 or at the same time as unlocking, the controller 150 may control the output interface 130 to output the notification requesting removal of the ingredients (or ingredient container) contained in the ingredient supplier 3 and emptying of the water of the water tank. For example, the notification may be output in the form of a graphic and/or sound through at least one of the display 132 or the sound output interface 134.

According to an embodiment, the controller 150 may transmit the notification requesting removal of the ingredients and emptying of the water of the water tank to the terminal of the user through the communication interface 110. Embodiments regarding this will be described hereinafter with reference to FIGS. 7 to 8B.

The beverage maker may receive a beverage making initiation request based on the output notification (S450). The beverage making initiation request may be a request for initiating the above-described beverage making operation (for example, the fermentation operation and the aging operation).

According to an embodiment, the beverage making initiation request may correspond to a user input indicating that removal of the ingredients and the emptying of the water of the water tank are completed. When the beverage making initiation request is received, the beverage maker may identify whether the ingredient supplier lid 31 and the water tank lid 51 are opened and closed (S460).

After checking the output notification, the user may open the ingredient supplier lid 31 and may remove the ingredients (or ingredient container) contained in the ingredient supplier 3. In addition, the user may open the water tank lid 51 and may empty the water out of the water tank. After removing the ingredients, the user may close the ingredient supplier lid 31, and after removing the water, the user may close the water tank lid 51.

The ingredient supplier lid opening-closing detection sensor 32 may detect that the ingredient supplier lid 31 is opened and closed, and the water tank lid opening-closing detection sensor 52 may detect that the water tank lid 51 is opened and closed. When the beverage making initiation request is received, the controller 150 may detect whether the ingredients are removed and the water is emptied by identifying whether the ingredient supplier lid 31 and the water tank lid 51 are opened and closed.

More specifically, when it is detected by the ingredient supplier lid opening-closing detection sensor 32 that the ingredient supplier lid 31 is opened and closed in the middle of or while outputting the notification or after outputting the notification, the controller 150 may detect that the ingredients in the ingredient supplier 3 are removed. In addition, when it is detected from the water tank lid opening-closing detection sensor 52 that the water tank lid 51 is opened and closed, the controller 150 may detect that the water in the water tank is removed (emptied).

When it is detected that the ingredient supplier lid 31 and the water tank lid 51 are opened and closed (YES in S460), the beverage maker may detect that the ingredients and the water are removed, and may perform the beverage making operation (S470). On the other hand, when it is not detected that the ingredient supplier lid 31 and the water tank lid 51 are opened and closed (NO in S460), the beverage maker may detect that the ingredients and the water are not removed. In this case, the controller 150 may re-output the notification requesting removal of the ingredients and emptying of the water (S440).

According to an embodiment, the user may not identify or see the notification. In this case, the ingredients may not be removed and the water may not be emptied, and the beverage maker may not initiate the beverage making operation. However, as the beverage making operation may be performed regardless of whether the ingredients are removed and the water is emptied, it may be appropriate that the beverage making operation is initiated even when the ingredients are not removed and the water is not emptied. Accordingly, when the beverage making initiation request is not received for a predetermined period of time after the notification is output, the controller 150 may automatically initiate the beverage making operation.

FIGS. 5A to 5F are example views of screens output through the display in relation to the beverage making preparation operation performed by the beverage maker. When a request for execution of the beverage making function is received through the input interface 120, the controller 150 may display screens for obtaining recipe information of a beverage to be made.

Figure 5A:
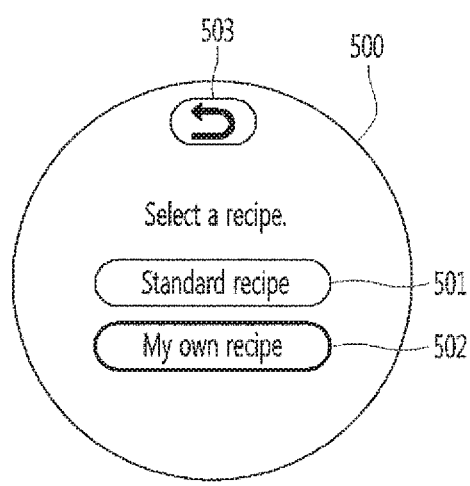
FIGS. 5A to 5F are example views of screens output through a display in relation to a beverage making preparation operation performed by the beverage maker.

For example, referring to FIG. 5A the controller 150 may display a recipe selection screen 500 for determining a recipe input type through the display 132. The recipe selection screen 500 may include a first item 501 to obtain recipe information through already registered recipes (standard recipe), and a second item 502 to obtain recipe information through a recipe directly set by the user. According to an embodiment, the recipe selection screen 500 may further include a back item 503 to cancel the beverage making function.

Any one of the items 501-503 may be highlighted according to an operation of the input interface, for example, rotation of the rotary knob 122, and the highlighted item may be selected according to an operation of the input interface 120, for example, pressing of the rotary knob 122. When the first item 501 is selected, the controller 150 may display a screen including a list of recipes already registered through the display 132, although this screen is not illustrated. The controller 150 may receive an input of selecting any one of the recipes included in the list through the input interface 120, and may obtain recipe information through the selected recipe. On the other hand, when the second item 502 is selected, the controller 150 may sequentially output recipe input screens for obtaining ingredients of a beverage to be made and characteristics of the beverage, and may obtain recipe information based on the output recipe input screens.

Figure 5B:
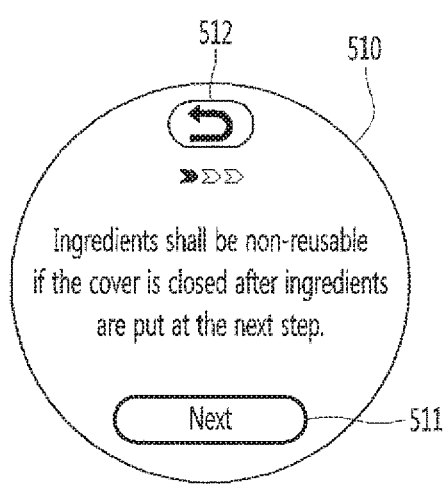
Figure 5C:
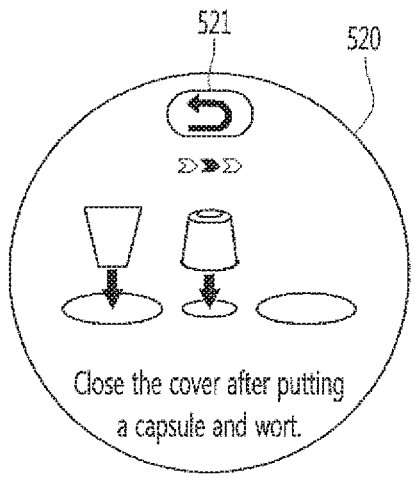

Referring to FIGS. 5B and 5C, after obtaining the recipe information, the controller 150 may provide an ingredient inputting guide to guide the user to input ingredients necessary for making the beverage. For example, before ingredients (or an ingredient container) are input, the controller 150 may display, through the display 132, a guide screen 510 indicating that the ingredients shall be non-reusable if the ingredient supplier lid 31 is closed after the ingredients are input.

When a progress item 511 included in the guide screen 510 is selected, the controller 150 may display an ingredient inputting guide screen 520 to guide input of ingredients through the display 132. The user may put ingredients of the beverage into the ingredient supplier 3 (or the ingredient supplier 3 and the fermentation module 1) based on the ingredient inputting guide screen 520.

In this case, the controller 150 may detect opening and closing of the ingredient supplier lid 31 through the ingredient supplier lid opening-closing detection sensor 32. The user may open the ingredient supplier lid 31 and then put ingredients into the ingredient supplier 3, and may close the ingredient supplier lid 31. As it is detected that the ingredient supplier lid 31 is opened and closed, the controller 150 may detect that the ingredients are put into the ingredient supplier 3. As it is detected that the ingredients have been input, the controller 150 may display a next screen of the ingredient inputting guide screen 520 through the display 132.

Although not shown, the next screen may be a water inputting guide screen to guide putting of water into the water tank. The controller 150 may detect that water is put into the water tank by detecting that the water tank lid 51 is opened and closed through the water tank lid opening-closing detection sensor 52.

Figure 5D:
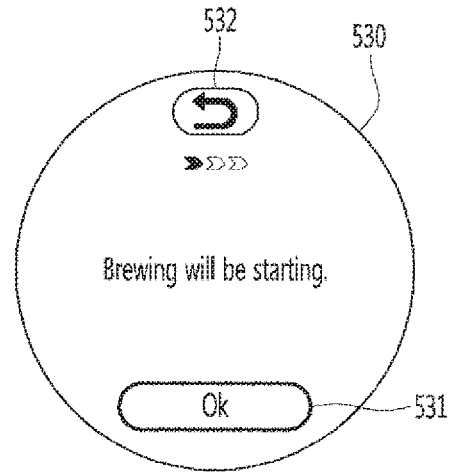

Referring to FIG. 5D, when it is detected that input of the ingredients and the water is completed, the controller 150 may display a guide screen 530 guiding that the beverage making preparation operation will be initiated through the display 132. According to an embodiment, the guide screen 530 may include a confirmation item 531 to receive a request for initiation of the beverage making preparation operation from the user.

The user may select the confirmation item 531 by operating the rotary knob 122, and the controller 150 may initiate the beverage making preparation operation, for example, the ingredient inputting and mixing operation (S300) and the temperature control operation (S310), in response to the selection of the confirmation item 531.

Figure 5E:
Figure 5F:
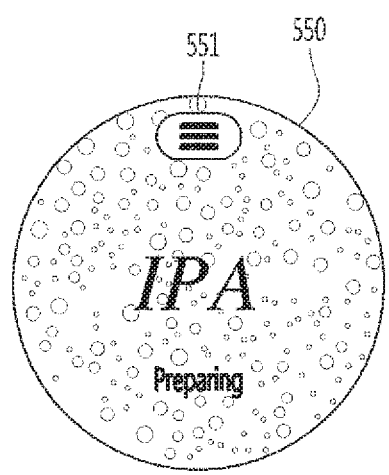

According to an embodiment, as shown in FIG. 5E, the controller 150 may display a notification screen 540 informing an estimate removal time of the ingredients contained in the ingredient supplier 3 (or an estimated emptying time of the water of the water tank) in advance through the display 132. Referring to FIG. 5F, the controller 150 may display a preparation screen 550 indicating that making of the beverage is being prepared through the display 132 as the beverage making preparation operation is initiated. For example, the preparation screen 550 may include a recipe name (or a beverage name) based on set recipe information, a graphic image indicating characteristics of the beverage, and/or a menu item 551 to enter a menu.

When the set recipe information corresponds to a recipe pre-set in the beverage maker, the controller 150 may display a recipe name corresponding to the name of the pre-set recipe. On the other hand, when the set recipe information is recipe information input by the user, the controller 150 may display a recipe name indicating that the recipe information is input by the user.

In addition, the controller 150 may display the graphic image indicating characteristics of the beverage to be made, based on ingredients included in the set recipe information and characteristics of the beverage. For example, the graphic image may indicate a color of the beverage, and/or an amount of carbonic acid, for example; however, embodiments are not limited hereto.

In addition, when the menu item 551 is selected, the controller 150 may provide recipe information through the display 132, for example, or may provide a setting function related to the making of the beverage.

Figure 6:
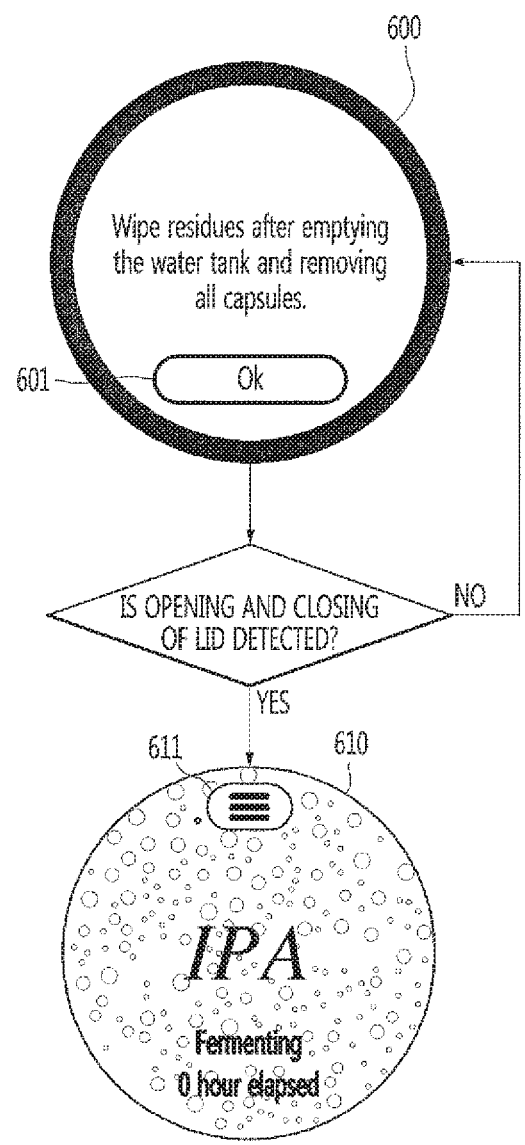
FIG. 6 is an example view of screens output through the display in relation to operations of the beverage maker requesting and detecting the removal of the ingredients contained in the Ingredient supplier and emptying of the water of the water tank.

FIG. 6 is an example view of screens output through the display in relation to operations of the beverage maker requesting and detecting removal of the ingredients contained in the ingredient supplier and emptying of the water of the water tank. The controller 150 may perform the above-described beverage making preparation operation while displaying the preparation screen 550 described above with reference to FIG. 5F.

Referring to FIG. 6, after the beverage making preparation operation is completed, the controller 150 may perform the beverage making operation, for example, the fermentation operation (S320) and the aging operation (S330). In the beverage making operation, water or ingredients may not be put into the fermentation module 1 or the fermentation tank any longer. Accordingly, residual ingredients or the ingredient container contained in the ingredient supplier 3 may be removed from the ingredient supplier 3, and water contained in the water tank of the water supply module 5 may be removed from the water tank.

Accordingly, when the beverage making preparation operation is completed, the controller 150 may display a notification screen 600 requesting removal of the ingredients (or ingredient container) contained in the ingredient supplier 3 and emptying of the water of the water tank through the display 132. According to an embodiment, the controller 150 may output a voice or a sound corresponding to the request for the removal of the ingredients and the emptying of the water through the sound output interface 134 when outputting the notification screen 600.

After identifying or viewing the notification screen 600, the user may open the ingredient supplier lid 31 and may remove the ingredients (or ingredient container) contained in the ingredient supplier 3. In addition, the user may open the water tank lid 51 and may empty the water out of the water tank. The user may close the ingredient supplier lid 31 after removing the ingredients, and may close the water tank lid 51 after removing the water. The ingredient supplier lid opening-closing detection sensor 32 may detect that the ingredient supplier lid 31 is opened and closed, and the water tank lid opening-closing detection sensor 52 may detect that the water tank lid 51 is opened and closed.

After removing the ingredients and the water, the user may select a confirmation item 601 included in the notification screen 600 by operating the rotary knob 122. The controller 150 may receive the beverage making initiation request described in S450 of FIG. 4 by receiving the selection input of the confirmation item 601. That is, the selection input of the confirmation item 601 may correspond to the beverage making initiation request.

When the beverage making initiation request is received, the controller 150 may detect whether the ingredients are removed and the water is emptied by checking whether the ingredient supplier lid 31 and the water tank lid 51 are opened and closed. More specifically, when it is detected from the ingredient supplier lid opening-closing detection sensor 32 that the ingredient supplier lid 31 is opened and closed in the middle of or while displaying the notification screen 600, the controller 150 may detect that the ingredients in the ingredient supplier 3 are removed. In addition, when it is detected from the water tank lid opening-closing detection sensor 52 that the water tank lid 51 is opened and closed, the controller 150 may detect that the water in the water tank is removed (emptied). When it is detected that the ingredients are removed and the water is emptied, the controller 150 may initiate the beverage making operation.

According to an embodiment, the user may not identify or see the notification screen 600. In this case, the ingredients may not be removed and the water may not be emptied, and the beverage maker may not initiate the beverage making operation. However, as the beverage making operation may be performed regardless of whether the ingredients are removed and the water is emptied, it may be appropriate that the beverage making operation is performed even when the ingredients are not removed and the water is not emptied.

Accordingly, when the selection input of the confirmation item 601 is not received for a predetermined period of time after the notification screen 600 is output, the controller 150 may automatically initiate the beverage making operation. When an operation through the input interface 120 is detected in the middle of or while initiating of the beverage making operation, the controller 150 may display the screen requesting removal of the ingredients and emptying of water through the display 132, and then may display a beverage making state screen 610. Accordingly, the user may remove the ingredients in the ingredient supplier 3 and empty the water out of the water tank even in the middle of or during the beverage making operation.

As the beverage making operation is initiated, the controller 150 may display the beverage making state screen 610 indicating that the beverage is being made through the display 132. For example, the beverage making state screen 610 may include a recipe name (or a beverage name) based on set recipe information, a graphic image indicating characteristics of the beverage, information regarding the current beverage making operation (or beverage making state information), and a menu item 611 to enter a menu.

When the set recipe information corresponds to a recipe pre-set in the beverage maker, the controller 150 may display a recipe name corresponding to the name of the pre-set recipe. On the other hand, when the set recipe information is recipe information input by the user, the controller 150 may display a recipe name indicating that the recipe information is input by the user.

The controller 150 may display a graphic image indicating characteristics of the beverage which is being made, based on ingredients and beverage characteristics included in the set recipe information. For example, the graphic image may indicate a color of the beverage, and/or an amount of carbonic acid, for example; however, embodiments are not limited hereto.

In addition, the controller 150 may display a current beverage making operation of the beverage, based on an elapsed time of making of the beverage, a temperature or pressure in the fermentation tank of the fermentation module 1, and/or a current control state of components related to making of the beverage, for example. For example, when it is identified that the current beverage making operation is the fermentation operation, the controller 150 may indicate that the beverage is currently being fermented through the beverage making state screen 610.

In addition, in response to a selection input of the menu item 611, the controller 150 may provide recipe information, a setting function related to the operation of the beverage maker, or a function related to stop or cancellation of making of the beverage, for example. That is, according to the embodiment illustrated in FIGS. 4 to 6, after the ingredients contained in the ingredient supplier 3 and the water contained in the water tank are put into the fermentation module 1 or the fermentation tank in the beverage making preparation operation, the beverage maker may induce the user to remove the residual ingredients (or ingredient container) contained in the ingredient supplier 3 and the water contained in the water tank. Accordingly, contamination which may be caused by the residual ingredients or water left unused in the beverage maker for a long period of time may be effectively prevented.

Figure 7:
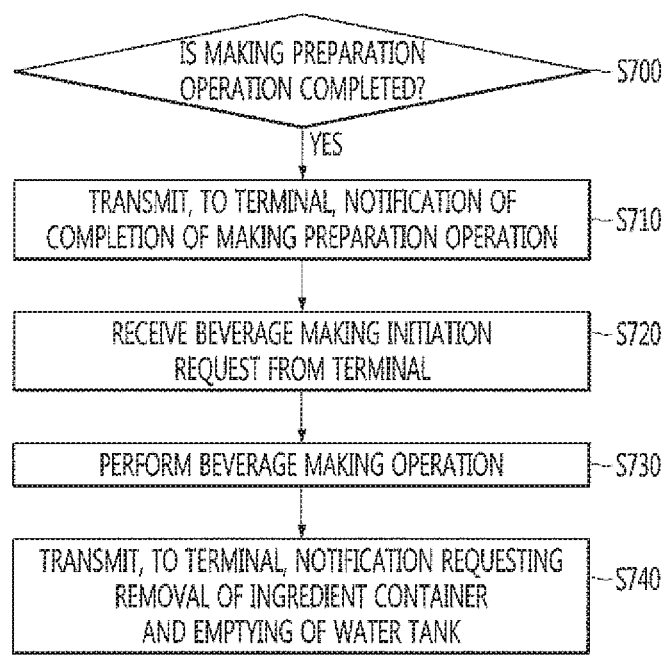
FIG. 7 is a flowchart to explain an operation of the beverage maker transmitting, to a terminal, a request for removal of the ingredients contained in the ingredient supplier and emptying of the water of the water tank.
Figure 8A:
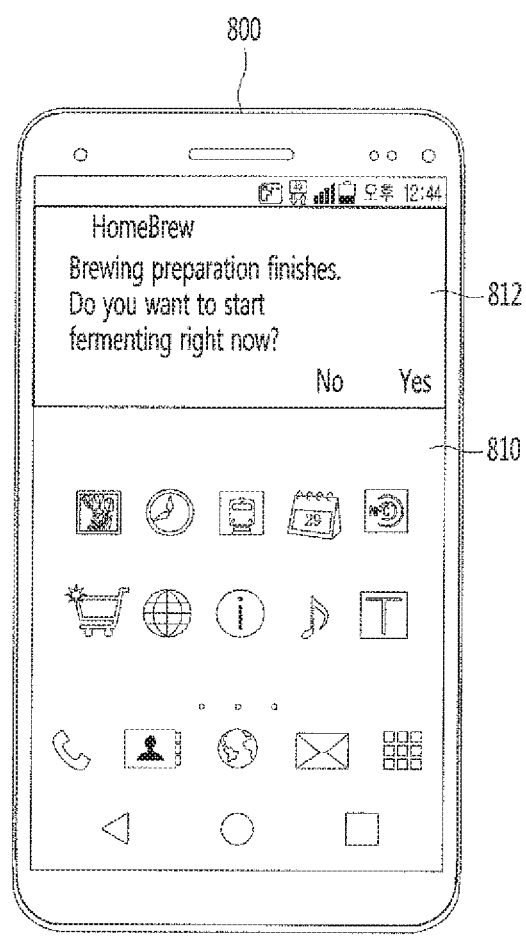
FIGS. 8A and 8B are views illustrating examples of notifications output at a terminal according to the embodiment shown in FIG. 7.
Figure 8B:
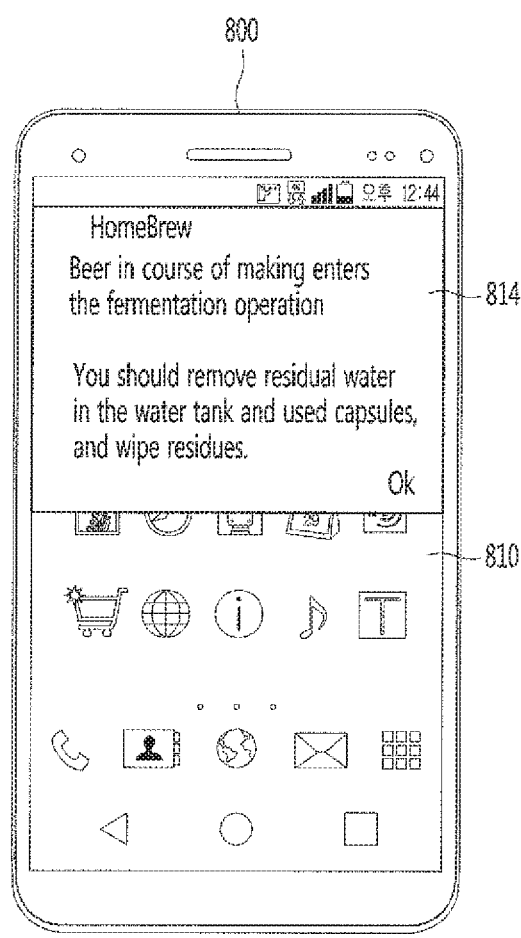

FIG. 7 is a flowchart to explain an operation of the beverage maker transmitting a request for removal of the ingredients contained in the ingredient supplier and emptying of the water in the water tank to a terminal. FIGS. 8A and 8B are views illustrating examples of notifications output from the terminal in relation to the embodiments shown in FIG. 7. Referring to FIG. 7, S700 is substantially the same as S420 of FIG. 4, and thus, a description thereof has been omitted.

When the beverage making preparation operation is completed (YES in S700), the beverage maker may transmit a notification of completion of the beverage making preparation operation to the terminal of the user (S710). The beverage maker may receive a request for initiation of the beverage making operation from the terminal, based on the transmitted notification of completion (S720). The controller 150 may control the communication interface 110 to transmit the notification of completion of the beverage making preparation operation to the terminal of the user which is already registered at the beverage maker.

Referring to FIG. 8A, the terminal 800 may display a notification message 812 of completion of the beverage making preparation operation through the display 810 based on the notification of completion of the beverage making preparation operation received from the beverage maker. The completion notification message 812 may be output in the form of a push notification, for example; however, embodiments are not limited hereto.

The terminal 800 may receive an input regarding whether the beverage making operation will be initiated from the user through the completion notification message 812. That is, the user may recognize that the beverage making preparation operation is completed through the output completion notification message 812, and may input a request for initiation of the beverage making operation. When the request for initiation of the beverage making operation is input from the user, the terminal 800 may transmit the input initiation request to the beverage maker.

Referring to this embodiment as well the embodiment of FIG. 4, the controller 150 may output the notification requesting removal of the ingredients (or ingredient container) contained in the ingredient supplier 3 and emptying of the water of the water tank through the display 132 when the beverage making preparation operation is completed. However, when the user goes out and is not in a house where the beverage maker is installed, the user may not identify or see the notification output through the display 132. Therefore, the ingredients may not be removed and the water may not be emptied, and the beverage making operation may not be normally performed. However, as the beverage making operation may be performed regardless of whether the ingredients are removed and the water is emptied, it may be appropriate that the beverage making operation is initiated even when the ingredients are not removed and the water is not emptied.

To achieve this, when a predetermined period of time has elapsed after the notification requesting removal of the ingredients and emptying of the water is output through the display 132, the controller 150 may transmit the notification of completion of the beverage making preparation operation to the terminal. Accordingly, the user may identify or see that the beverage making preparation operation of the beverage maker is completed through the terminal even if the user is away from the beverage maker. The beverage maker may perform the beverage making operation according to reception of the request for initiation of the beverage making operation (S730).

When the user goes out and is not in his/her house, the beverage maker may receive the request for initiation of the beverage making operation from the terminal, and may initiate the beverage making operation, first, with the ingredients and the water being contained. That is, the user may transmit the request for initiation of the beverage making operation through the terminal, such that a problem of deterioration of quality of the beverage, caused by the beverage beverage making operation not being performed for a long time, may be prevented.

According to an embodiment, the beverage maker may transmit the request for removal of the ingredients (or ingredient container) contained in the ingredient supplier 3 and emptying of the water of the water tank to the terminal. Referring to FIG. 8B, the terminal may display a notification message 814 based on the notification received from the beverage maker through the display 810.

In addition, when the request for initiation of the beverage making operation is input from the user, the terminal may transmit the input initiation request to the beverage maker, and may directly display the notification message 814 requesting removal of the ingredients and emptying of the water through the display 810. The user may go back to his/her house where the beverage maker is installed, and then remove the ingredients and empty the water, based on the displayed notification message 814, such that contamination of the inside of the beverage maker may be prevented.

According to various embodiments, the beverage maker may induce the user to remove residual ingredients and residual water after ingredients and water for making the beverage are put into the fermentation tank, such that contamination of the inside of the beverage maker, caused by the residual ingredients and the residual water left unused for a long period of time, may be effectively prevented. In addition, as the beverage maker may provide information regarding an appropriate time to remove the residual ingredients from the ingredient supplier and the residual water from the water tank, the user may easily remove the residual ingredients and the residual water without confusion based on the provided information.

Further, even if the user is not at home, and thus, is not able to remove the residual ingredients from the ingredient supplier and the residual water from the water tank, the beverage maker may automatically initiate the beverage making operation, or transmit a notification to the terminal of the user, may receive a request for initiation of the beverage making operation, and may initiate the beverage making operation. Accordingly, a problem of change in quality of the beverage or deterioration in quality of the beverage, caused by the beverage making operation not being normally performed, may be effectively prevented.

Embodiments disclosed herein provide a beverage maker which may prevent contamination of an ingredient supplier containing ingredients for making a beverage, and a water tank containing water. Embodiments disclosed herein further provide a beverage maker which may inform of an appropriate time to remove residual Ingredients or an ingredient container of an ingredient supplier, and residual water of a water tank. Embodiments disclosed herein also provide a beverage maker which may recognize a situation in which a user is away from the beverage maker and cannot remove residual ingredients and residual water, and may automatically perform a beverage making operation.

A beverage maker according to an embodiment may contain at least some of ingredients for making a beverage in an ingredient supplier, may contain water for making the beverage in a water tank, and may perform a making preparation operation and a beverage making operation for making the beverage. When the beverage making preparation operation is completed, the beverage maker may output a request for removal of residual ingredients existing in the ingredient supplier, and residual water existing in the water tank, thereby inducing a user to remove the residual ingredients and the residual water. When a beverage making initiation request based on the output request is received, the beverage maker may determine whether to initiate the beverage making operation by detecting whether the residual ingredients and the residual water are removed.

According to embodiments disclosed herein, the beverage maker may detect whether the residual ingredients are removed by detecting whether an ingredient supplier lid is opened and closed, after outputting the request for removal of the residual ingredients and the residual water. The beverage maker may detect whether the residual water is removed by detecting whether a water tank lid is opened and closed, after outputting the request for removal of the residual ingredients and the residual water. When it is detected that at least one of the residual ingredients or the residual water is not removed, the beverage maker may re-output the request for removal of the residual ingredients and the residual water.

When the beverage making initiation request is not received for a predetermined period of time after the request for removal of the residual ingredients and the residual water is output, the beverage maker may automatically initiate the beverage making operation, thereby enabling the beverage to be normally made. When the beverage making initiation request is not received for a predetermined period of time after the request for removal of the residual ingredients and the residual water is output, the beverage maker may transmit a notification of completion of the beverage making preparation operation to the terminal.

The beverage maker may receive a beverage making initiation request based on the transmitted completion notification from the terminal, and may initiate the beverage making operation based on the received beverage making initiation request, such that the user may transmit the beverage making initiation request to the beverage maker through the terminal even when the user is away from the beverage maker. The beverage making preparation operation may include putting the ingredients contained in the ingredient supplier and the water contained in the water tank into the fermentation tank.

Each of the at least some of the ingredients may be contained in the ingredient supplier while being contained in an ingredient container. When the making preparation operation is completed, the beverage maker may output a request for removal of the ingredient container of the ingredient supplier and the residual water.

The details of one or more embodiment are set forth in the accompanying drawings and description. Other features will be apparent from the description and drawings, and from the claims.

The subject matter disclosed herein is to be considered illustrative, and not restrictive, and the appended claims are intended to cover all such modifications, enhancements, and other implementations, which fall within the scope. Thus, implementation of embodiments is to be considered illustrative, and not restrictive. Therefore, the scope is defined not by the detailed description but by the appended claims, and all differences within the scope will be construed as being included in the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A beverage maker, comprising:
   a fermentation tank having a space to make a beverage therein;
   an ingredient supplier having a space to contain at least some of ingredients for making the beverage;
   a water tank configured to contain water to make the beverage;
   an output interface comprising at least one of a display or a speaker, and
   a controller configured to control a beverage making preparation operation and a beverage making operation for making the beverage, wherein when the beverage making preparation operation is completed, the controller is configured to output through the output interface a request for removal of a residual ingredient of the ingredient supplier and residual water of the water tank.

2. The beverage maker of claim 1, further comprising an input interface configured to receive an input from a user, wherein the controller is configured to receive through the input interface a beverage making initiation request based on the output request, detect whether the residual ingredient and the residual water are removed in response to the received beverage making initiation request, and when it is detected that the residual ingredient and the residual water are removed, initiate the beverage making operation.

3. The beverage maker of claim 2, further comprising:
   an ingredient supplier lid configured to open and close the ingredient supplier; and
   an ingredient supplier lid opening-closing detection sensor configured to detect whether the ingredient supplier lid is opened and closed, wherein the controller is configured to detect whether the ingredient supplier lid is opened and closed using the ingredient supplier lid opening-closing detection sensor, after outputting the request for the removal of the residual ingredient and the residual water, and when it is detected that the ingredient supplier lid is opened and closed, to detect that the residual ingredient is removed.

4. The beverage maker of claim 2, further comprising:
   a water tank lid configured to open and close the water tank; and
   a water tank lid opening-closing detection sensor configured to detect whether the water tank lid is opened and closed, wherein the controller is configured to detect whether the water tank lid is opened and closed using the water tank lid opening-closing detection sensor, after outputting the request for the removal of the residual ingredient and the residual water, and when it is detected that the water tank lid is opened and closed, to detect that the residual water is removed.

5. The beverage maker of claim 2, wherein when it is detected that at least one of the residual ingredient or the residual water is not removed, the controller is configured to control the output interface to re-output the request for the removal of the residual ingredient and the residual water.

6. The beverage maker of claim 2, wherein when the beverage making initiation request is not received for a predetermined period of time after the request for the removal of the residual ingredient and the residual water is output, the controller is configured to initiate the beverage making operation.

7. The beverage maker of claim 1, further comprising a communication interface configured to connect with a terminal of a user, wherein when the beverage making preparation operation is completed, the controller is configured to control the communication interface to transmit a notification of completion of the beverage making preparation operation to the terminal.

8. The beverage maker of claim 7, wherein when the beverage making initiation request is not received for a predetermined period of time after the request for the removal of the residual ingredient and the residual water is output, the controller is configured to transmit the notification of the completion of the beverage making preparation operation to the terminal.

9. The beverage maker of claim 7, wherein the controller is configured to receive a beverage making initiation request based on the transmitted notification of the completion from the terminal, and to initiate the beverage making operation based on the received beverage making initiation request.

10. The beverage maker of claim 1, wherein the beverage making preparation operation comprises putting, into the fermentation tank, the ingredients contained in the ingredient supplier and the water contained in the water tank.

11. The beverage maker of claim 1, wherein each of the at least some ingredients is supplied to the ingredient supplier while being contained in an ingredient container, and wherein when the beverage making preparation operation is completed, the controller is configured to output a request for removal of the ingredient container of the ingredient supplier and the residual water through the output interface.

12. A beverage maker, comprising:
a fermentation tank having a space to make a beverage therein;
an ingredient supplier having a space to contain at least some of ingredients for making the beverage;
a water tank configured to contain water to make the beverage;
an output interface comprising at least one of a display or a speaker;
a controller configured to control a beverage making preparation operation and a beverage making operation for making the beverage, wherein when the beverage making preparation operation is completed, the controller is configured to output through the output interface a request for removal of a residual ingredient of the ingredient supplier and residual water of the water tank;
an ingredient supplier lid configured to open and close the ingredient supplier,
an ingredient supplier lid opening-closing detection sensor configured to detect whether the ingredient supplier lid is opened and closed, wherein the controller is configured to detect whether the ingredient supplier lid is opened and closed using the ingredient supplier lid opening-closing detection sensor;
a water tank lid configured to open and close the water tank; and
a water tank lid opening-closing detection sensor configured to detect whether the water tank lid is opened and closed, wherein the controller is configured to detect whether the water tank lid is opened and closed using the water tank lid opening-closing detection sensor.

13. The beverage maker of claim 12, further comprising an input interface configured to receive an input from a user, wherein the controller is configured to receive through the input interface a beverage making initiation request based on the output request, detect whether the residual ingredient and the residual water are removed in response to the received beverage making initiation request, and when it is detected that the residual ingredient and the residual water are removed, initiate the beverage making operation.

14. The beverage maker of claim 13, wherein the controller is configured to detect:
after outputting the request for the removal of the residual ingredient and the residual water, and when it is detected that the ingredient supplier lid is opened and closed, to detect that the residual ingredient is removed; and
after outputting the request for the removal of the residual ingredient and the residual water, and when it is detected that the water tank lid is opened and closed, to detect that the residual water is removed.

15. The beverage maker of claim 13, wherein when it is detected that at least one of the residual ingredient or the residual water is not removed, the controller is configured to control the output interface to re-output the request for the removal of the residual ingredient and the residual water.

16. The beverage maker of claim 13, wherein when the beverage making initiation request is not received for a predetermined period of time after the request for the removal of the residual ingredient and the residual water is output, the controller is configured to initiate the beverage making operation.

17. The beverage maker of claim 13, further comprising a communication interface configured to connect with a terminal of a user, wherein when the beverage making preparation operation is completed, the controller is configured to control the communication interface to transmit a notification of completion of the beverage making preparation operation to the terminal, and wherein when the beverage making initiation request is not received for a predetermined period of time after the request for the removal of the residual ingredient and the residual water is output, the controller is configured to transmit the notification of the completion of the beverage making preparation operation to the terminal.

18. The beverage maker of claim 17, wherein the controller is configured to receive a beverage making initiation request based on the transmitted notification of the completion from the terminal, and to initiate the beverage making operation based on the received beverage making initiation request.

19. The beverage maker of claim 12, wherein the beverage making preparation operation comprises putting, into the fermentation tank, the ingredients contained in the ingredient supplier and the water contained in the water tank.

20. The beverage maker of claim 12, wherein each of the at least some ingredients is supplied to the ingredient supplier while being contained in an ingredient container, and wherein when the beverage making preparation operation is completed, the controller is configured to output a request for removal of the ingredient container of the ingredient supplier and the residual water through the output interface.

* * * * *